United States Patent
Chen

(10) Patent No.: US 9,451,256 B2
(45) Date of Patent: Sep. 20, 2016

(54) REUSING PARAMETER SETS FOR VIDEO CODING

(71) Applicant: QUALCOMM Incorporated, San Diego, CA (US)

(72) Inventor: Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 13/945,547

(22) Filed: Jul. 18, 2013

(65) Prior Publication Data

US 2014/0023138 A1 Jan. 23, 2014

Related U.S. Application Data

(60) Provisional application No. 61/673,918, filed on Jul. 20, 2012.

(51) Int. Cl.
*H04N 19/00* (2014.01)
*H04N 19/597* (2014.01)
(Continued)

(52) U.S. Cl.
CPC ...... *H04N 19/00769* (2013.01); *H04N 19/463* (2014.11); *H04N 19/597* (2014.11); *H04N 19/70* (2014.11); *H04N 19/30* (2014.11)

(58) Field of Classification Search
CPC ... H04N 19/463; H04N 19/597; H04N 19/70
USPC .................................................. 375/240.12
See application file for complete search history.

(56) References Cited

U.S. PATENT DOCUMENTS

| 2007/0291837 A1 | 12/2007 | Eleftheriadis |
| 2010/0091881 A1 | 4/2010 | Pandit et al. |

(Continued)

FOREIGN PATENT DOCUMENTS

| WO | 2012105265 A1 | 8/2012 |
| WO | 2013016231 A1 | 1/2013 |
| WO | 2013030458 A1 | 3/2013 |

OTHER PUBLICATIONS

Boyce et al. "SEI Message for Profile and level signaling for temporal scalability and extensions", JCT-VC Meeting; MPEG Meeting; Nov. 7, 2012-Jul. 20, 2012; Stockholm; (Joint Collaborative Team on Video Coding od ISO/IEC JTC1/SC29/WG11 and ITU-T SG. 16); URL: http://wftp3.itu.int/AV-ARCH/LCTVC-SITE/, No. JCTVC-J0245, XP030112606, 6 pp.*

(Continued)

*Primary Examiner* — Jeffery Williams
(74) *Attorney, Agent, or Firm* — Shumaker & Sieffert, P.A.

(57) ABSTRACT

In one example, a device includes a video coder (e.g., a video encoder or a video decoder) configured to code parameter set information for a video bitstream, code video data of a base layer of the video bitstream using the parameter set information, and code video data of an enhancement layer of the video bitstream using at least a portion of the parameter set information. The parameter set information may include, for example, profile and level information and/or hypothetical reference decoder (HRD) parameters. For example, the video coder may code a sequence parameter set (SPS) for a video bitstream, code video data of a base layer of the video bitstream using the SPS, and code video data of an enhancement layer of the video bitstream using at least a portion of the SPS, without using any other SPS for the enhancement layer.

43 Claims, 6 Drawing Sheets

(51) Int. Cl.
*H04N 19/70* (2014.01)
*H04N 19/463* (2014.01)
*H04N 19/30* (2014.01)

(56) References Cited

U.S. PATENT DOCUMENTS

| | | | |
|---|---|---|---|
| 2010/0266042 A1 | 10/2010 | Koo et al. | |
| 2011/0255796 A1 | 10/2011 | Nakamura et al. | |
| 2012/0023249 A1 | 1/2012 | Chen et al. | |
| 2012/0044322 A1 | 2/2012 | Tian et al. | |
| 2012/0219069 A1* | 8/2012 | Lim et al. | 375/240.25 |
| 2012/0236115 A1 | 9/2012 | Zhang et al. | |
| 2014/0022343 A1 | 1/2014 | Chen | |

OTHER PUBLICATIONS

Chen, et al., "AHG12: Video parameter set and its use in 3D-HEVC", JCT-VC Meeting; MPEG Meeting; Apr. 27, 2012-Jul. 5, 2012; Geneva; (Joint Collaborative Team on Video Coding of ISO/IEC JTC1/SC291 WG11 and ITU-T SG.16 ); URL: http://wftp3.itu.intiav-arch/jctvc-site/, No. JCTVC-I0571, XP030112334, 9 pp.*

Hannuksela et al., "Hook for Scalable ExtensionsVideo Parameter Set", JCT-VC Meeting; MPEG Meeting; Apr. 27, 2012-Jul. 5, 2012; Geneva; (Joint Collaborative Team on Video Coding of ISO/IEC JTC1/SC291 WG11 and ITU-T SG.16 ); URL:http://wftp3.itu.int/av-arch/jctvc-site/, No. JCTVC-I0524, XP030112287, 6 pp.*

Chen, et al., "AHG10: On video parameter set for HEVC extensions," JCT-VC Meeting; MPEG Meeting; Nov. 7, 2012-Jul. 20, 2012; Stockholm; (Joint Collaborative Team on Video Coding of ISO/IEC JTCII SC29IWG11 and ITU-T SG.16); URL: htip:iiwftp3.itu.int/av-arch/jctvc-site/, No. JCTVC-J0124, XP030112486, 15 pp.*

Boyce, et al., "Information for scalable extension high layer syntax", JCT-VC Meeting; MPEG Meeting; Jan. 2, 2012-Oct. 2, 2012; San Jose; (Joint Collaborative Team on Video Coding of ISO/ IEC JTC1/SC29/WG11 and ITU-T SG.16 ); URL:http://wftp3.itu.int/AV-ARCH/JCTVC-SITE/, No. JCTVC-H0386, XP030111413, 7 pp.

Boyce, et al., "SEI Message for profile and level signaling for temporal scalability and extensions", JCT-VC Meeting; MPEG Meeting; Nov. 7, 2012-Jul. 20, 2012; Stockholm; (Joint Collaborative Team on Video Coding of ISO/IEC JTC1/SC29/WG11 and ITU-T SG.16 ); URL:http://wftp3.itu.int/AV-ARCH/JCTVC-SITE/, No. JCTVC-J0245, XP030112607, 6 pp.

Boyce, et al., "High level syntax hooks for future extensions", JCT-VC Meeting; MPEG Meeting; Jan. 2, 2012-Oct. 2, 2012 ; San Jose; (Joint Collaborative Team on Video Coding of ISO/IEC JTC1/SC29/WG11 and ITU-T SG.16); URL: http:// wftp3. itu.int/av-arch/jctvc-site/, No. JCTVC-H0388, XP030111415, 8 pp.

Boyce, et al., "VPS syntax for scalable and 3D extensions", JCT-VC Meeting; MPEG Meeting; Nov. 7, 2012-Jul. 20, 2012; Stockholm; (Joint Collaborative Team on Video Coding of ISO/IEC JTC1/SC29/WG11 and ITU-T SG.16 ); URL: http://wftp3.itu.int/av-arch/jctvc-site/, No. JCTVC-J0576, XP030112938, 3 pp.

Bross et al., "High efficiency video coding (HEVC) text specification draft 10 (for FDIS & Last Call)," 12th Meeting: Geneva, CH, 14-23 Jan. 2013, JCTVC-L1003_v34, 310 pp.

Bross, et al., "High efficiency video coding (HEVC) text specification draft 7 (JCTVC-I1003 d6)", Joint Collaborative Team on Video Coding (JCT-VC) of ITU-T SG16 WP3 and ISO/IEC JTC1/SC29/WG11 9th Meeting: Geneva, CH, Apr. 27-May 7, 2012, XP055060259, Retrieved from the Internet: URL:http://phenix.int-evry.fr/jct2/index.php, 290 pp. [uploaded in parts].

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen, et al., "AHG10: On video parameter set for HEVC extensions," JCT-VC Meeting; MPEG Meeting; Nov. 7, 2012-Jul. 20, 2012; Stockholm; (Joint Collaborative Team on Video Coding of ISO/IEC JTC1/SC29/WG11 and ITU-T SG.16 ); URL: http://wftp3.itu.int/av-arch/jctvc-site/, No. JCTVC-J0124, XP030112486, 15 pp.

Chen, et al., "AHG10: Video parameter set for HEVC base specification", JCT-VC Meeting; MPEG Meeting; Nov. 7, 2012-Jul. 20, 2012; Stockholm; (Joint Collaborative Team on Video Coding of ISO/IEC JTC1/SC29/WG11 and ITU-T SG.16 ); URL: URL:http://wftp3.itu.int/AV-ARCH/JCTVC-SITE/, No. JCTVC-J0114, XP030112476, 15 pp.

Chen, et al., "AHG12: Video parameter set and its use in 3D-HEVC", JCT-VC Meeting; MPEG Meeting; Apr. 27, 2012-Jul. 5, 2012; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-I0571, XP030112334, 9 pp.

Choi, et al., "AHG7: Video parameter set extension design for MV-HEVC and 3D-HEVC", JCT-3V Meeting; MPEG Meeting; Jan. 17, 2013-Jan. 23, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-C0106, XP030130522, 6 pp.

Hannuksela et al., "Hook for Scalable Extensions:Video Parameter Set", JCT-VC Meeting; MPEG Meeting; Apr. 27, 2012-Jul. 5, 2012; Geneva; (Joint Collaborative Team on Video Coding of ISO/IEC JTC1/SC29/WG11 and ITU-T SG.16 ); URL:http://wftp3.itu.int/av-arch/jctvc-site/, No. JCTVC-I0524, XP030112287, 6 pp.

Ikai, et al., "AHG7:on VPS extension", JCT-3V Meeting; MPEG Meeting; Jan. 17, 2013-Jan. 23, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-C0086, XP030130502, 6 pp.

International Search Report and Written Opinion—PCT/US2013/051248, International Search Authority—European Patent Office, Sep. 5, 2013, 13 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Muller, et al., "3D High-Efficiency Video Coding for Multi-View Video and Depth Data," IEEE Transactions on Image Processing, Special Issue on 3D Video Representation, Compression and Rendering, Dec. 2013, 13 pp.

Skupin, et al., "AHG9/AHG10: Design of the Video Parameter Set", JCT-VC Meeting; MPEG Meeting; Nov. 7, 2012-Jul. 20, 2012; Stockholm; (Joint Collaborative Team on Video Cooing of ISO/IEC JTC1/SC29/WG11 and ITU-T SG.16); URL: http://wftp3.itujnt/av-arch/jctvc-site/, No. JCTVC-J0257, XP030112619, 9 pp.

Sullivan, et al., "Overview of the High Efficiency Video Coding (HEVC) Standard", IEEE Transactions on Circuits and Systems for Video Technology, IEEE Service Center, Piscataway, NJ, US, vol. 22 (12), Dec. 1, 2012, XP011486324, pp. 1649-1668.

Tech, et al., "3D-HEVC Test Model 2,"Joint Collaborative Team on 3D Video Coding Extension Development of ITU-T SG 16 WP 3 and ISO/IEC JTC 1/SC 29/WG 11, Document: JCT3V-B1005_d0, 2nd Meeting: Shanghai, CN, XP030130414, Oct. 13-19, 2012, 118 pp.

Wiegand et al., "WD1: Working Draft 1 of High-Efficiency Video Coding", JCTVC-C403, 3rd Meeting: Guangzhou, CN, Oct. 7-15, 2010, 137 pp.

(56) References Cited

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wang "Report of BoG on high-level syntax for extension planning", JCT-VC Meeting; MPEG Meeting; Nov. 7, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/, No. JCTVC-J0574, Jul. 19, 2012, XP030112936, 17 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2013/051248, dated Jul. 14, 2014, 6 pp.

Bross et al., "WD4: Working Draft 4 of High-Efficiency Video Coding," 6th Meeting: JCTVC-F803_d1, Torino, IT, Sep. 8, 2011, 222 pp.

"ITU-T H.265, Series H: Audiovisual and Multimedia Systems, Infrastructure of audiovisual services—Coding of moving video, High efficiency video coding, The International Telecommunication Union, Oct. 2014, 540 pp."

\* cited by examiner

REUSING PARAMETER SETS FOR VIDEO CODING

This application claims the benefit of U.S. Provisional Application Ser. No. 61/673,918, filed Jul. 20, 2012, the entire contents of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Techniques of the upcoming HEVC standard are described in document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012, which, as of Jul. 20, 2012, is downloadable from http://phenix.it-sudparis.eu/jct/doc_end_user/documents/9_Geneva/wg11/JCTVC-I1003-v10.zip.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding video data. Coding of video data may include the use of signaling data, e.g., data of parameter sets such as sequence parameter sets (SPSs). Data of an SPS may be used to code a sequence of pictures, e.g., a set of pictures starting with an instantaneous decoder refresh (IDR) picture and including pictures up to a subsequent IDR picture. This disclosure describes techniques related to reusing parameter set data, such as an SPS, in an extension of a video coding standard, e.g., a multi-view/stereo extension of the upcoming High Efficiency Video Coding (HEVC) standard or a three-dimensional extension of HEVC. For example, a video coder may use the SPS to code a base layer (or base view) as well as an enhancement layer (or dependent view). Thus, the video coder may use the same SPS to code multiple layers/views. The video coder need not use any other SPSs to code the multiple layers/views, other than the one SPS that is used to code the multiple layers/views.

In one example, a method of decoding video data includes decoding a sequence parameter set (SPS) for a video bitstream, decoding a video parameter set (VPS) for the bitstream, decoding video data of a base layer of the video bitstream using the SPS, and decoding video data of an enhancement layer of the video bitstream using at least a portion of the SPS, without using any other SPS for the enhancement layer, and using at least a portion of the VPS.

In another example, a method of encoding video data includes encoding a sequence parameter set (SPS) for a video bitstream, encoding a video parameter set (VPS) for the bitstream, encoding video data of a base layer of the video bitstream using the SPS, and encoding video data of an enhancement layer of the video bitstream using at least a portion of the SPS, without using any other SPS for the enhancement layer, and using at least a portion of the VPS.

In another example, a device for coding (e.g., encoding or decoding) video data includes a video coder configured to code a sequence parameter set (SPS) for a video bitstream, code a video parameter set (VPS) for the bitstream, code video data of a base layer of the video bitstream using the SPS, and code video data of an enhancement layer of the video bitstream using at least a portion of the SPS, without using any other SPS for the enhancement layer, and using at least a portion of the VPS.

In another example, a device for coding video data includes means for coding a sequence parameter set (SPS) for a video bitstream, means for coding a video parameter set (VPS) for the bitstream, means for coding video data of a base layer of the video bitstream using the SPS, and means for coding video data of an enhancement layer of the video bitstream using at least a portion of the SPS, without using any other SPS for the enhancement layer, and using at least a portion of the VPS.

In another example, a computer-readable storage medium has stored thereon instructions that, when executed, cause a processor to code a sequence parameter set (SPS) for a video bitstream, code a video parameter set (VPS) for the bitstream, code video data of a base layer of the video bitstream using the SPS, and code video data of an enhancement layer of the video bitstream using at least a portion of the SPS, without using any other SPS for the enhancement layer, and using at least a portion of the VPS.

The details of one or more examples are set forth in the accompanying drawings and the description below. Other features, objects, and advantages will be apparent from the description and drawings, and from the claims.

DETAILED DESCRIPTION

Figure 1:
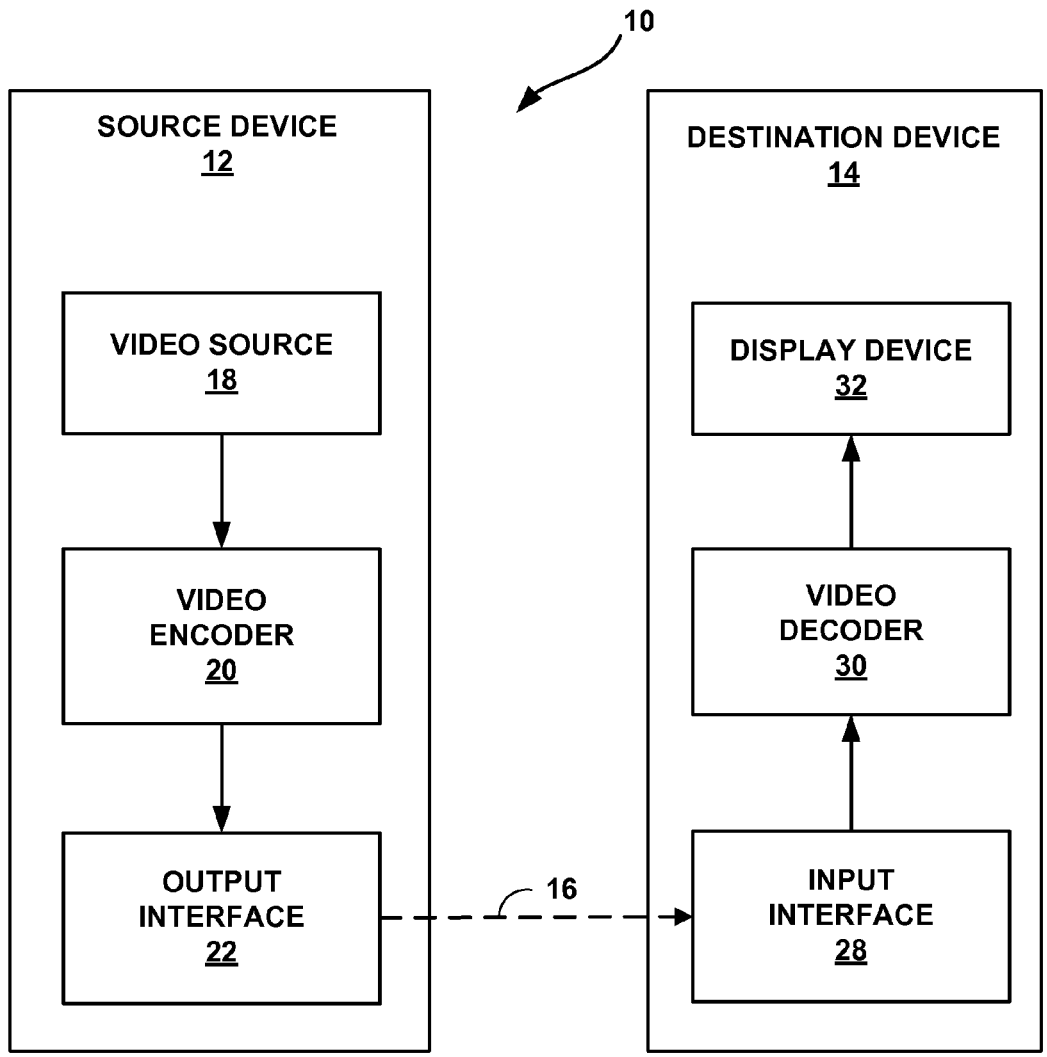
FIG. 1 is a block diagram illustrating an example video encoding and decoding system that may utilize techniques for reusing information of a parameter set, e.g., across various layers of a bitstream.

Video coding (e.g., encoding or decoding of video data) generally includes coding sequences of pictures using block-based video coding techniques. A sequence parameter set (SPS) generally describes parameters that are applicable to an entire sequence of pictures to which the SPS corresponds. In other words, SPSs may contain sequence-level signaling information, which may indicate how pictures of the corresponding sequence have been encoded, and thus, how a decoder is to decode the pictures of the corresponding sequence.

Parameter sets for video data may contain sequence-level signaling information (e.g., in SPSs) and infrequently-changing picture-level signaling information (e.g., in picture parameter sets (PPSs)). A video parameter set (VPS) may include signaling information for multiple layers (e.g., multiple views) of video data for a bitstream, where various layers may be used in multiview video coding, scalable video coding, temporal scalability, or other such techniques. In general, different views in multi-view video coding may represent examples of different layers, although other layers are also possible (e.g., temporal layers, spatial resolution layers, bit depth layers, or the like). An adaptation parameter set (APS) may include signaling information for slices of video data. With parameter sets (e.g., APS, PPS, SPS, and VPS), infrequently changing information need not to be repeated for each layer, sequence, picture, or slice, and therefore, coding efficiency may be improved.

In the context of video coding standard, a "profile" corresponds to a subset of algorithms, features, or tools and constraints that apply to them. As defined by Working Draft 7 of HEVC ("HEVC WD7"), for example, a "profile" is "a subset of the entire bitstream syntax" that is specified by HEVC WD7. A "level," as defined by HEVC WD7, is "a specified set of constraints imposed on values of the syntax elements in the bitstream. These constraints may be simple limits on values. Alternatively they may take the form of constraints on arithmetic combinations of values (e.g., picture width multiplied by picture height multiplied by number of pictures decoded per second)." In this manner, level values may correspond to limitations of decoder resource consumption, such as, for example, decoder memory and computation, which may be related to the resolution of the pictures, bit rate, and block processing rate. A profile may be signaled with a profile_idc (profile indicator) value, while a level may be signaled with a level_idc (level indicator) value.

HEVC WD7 also includes techniques for signaling hypothetical reference decoder (HRD) parameters. These parameters may generally describe a decoder for decoding the corresponding bitstream. For example, HRD parameters may describe a number of pictures to be stored in a coded picture buffer, a bit rate for the bitstream, a removal delay for removing pictures from the coded picture buffer, a decoded picture buffer output delay, or other such parameters. In this manner, a video decoder may use the HRD parameters to determine whether the video decoder is capable of properly decoding the corresponding bitstream.

In HEVC WD7, the video, sequence, picture, and adaptation parameter set mechanism may be used to decouple the transmission of infrequently changing information from the transmission of coded block data. Video, sequence, picture, and adaptation parameter sets may, in some applications, be conveyed "out-of-band", i.e., not transported together with the units containing coded video data. Out-of-band transmission is typically reliable.

In HEVC WD7, an identifier of a video parameter set (VPS), sequence parameter set (SPS), picture parameter set (PPS), or adaptation parameter set (APS) is coded using "ue(v)" coding, that is, unsigned-integer exponential-Golomb coding. In HEVC WD7, each SPS includes an SPS ID and a VPS ID, each PPS includes a PPS ID and an SPS ID, and each slice header includes a PPS ID and possibly an APS ID. Although video parameter set (VPS) data structures are supported in HEVC WD7, most of the sequence level information parameters are still only present in the SPS in HEVC WD7.

This disclosure recognizes several potential problems with the current design of HEVC. In the current HEVC design, the SPS contains a majority of the syntax elements, e.g., syntax elements for a base layer or base view, which might be shared by an enhancement layer or additional view (references herein to an "enhancement layer" should generally be understood to potentially include an additional view for multiview video coding). However, some syntax elements present in the SPS are not applicable to both views/layers, e.g., profile, level, and/or HRD parameters. Currently, in HEVC WD7, in a stereoscopic bitstream with a base view conforming to HEVC WD7, for example, a new instance of a sequence parameter set may be present, or the majority of the syntax elements may need to be present, in a video parameter set. In this manner, syntax elements are duplicated, even when the syntax elements are the same (that is, when the syntax elements have the same value).

This disclosure describes techniques for improving extensions to video coding standards, such as HEVC. For example, these techniques may include reusing data of a parameter set between layers of a bitstream. In some examples, an SPS belonging to a lower layer, e.g., a base layer or base view, may be shared by multiple layers/views. For example, an SPS with a profile/level defined in the base specification may be reused by view components in an enhancement layer (e.g., a dependent view). In general, multiple layers may be used in any of one or more scalable dimensions, such as spatial resolution, quality, time, or views. SVC and MVC represent examples of extensions for coding video data in scalable dimensions.

Furthermore, profile and level related information, and/or hypothetical reference decoder (HRD) parameters, which are currently signaled in the SPS of HEVC WD7 of the base layer/view, may be ignored. The profile and level information, and/or the HRD parameters, may be signaled only in the VPS, even if the SPS is referred to by a higher layer or dependent view. Thus, the profile and level information, and/or the HRD parameters, need not be signaled in SPSs. View dependency information for enhancement views (e.g., views other than the base view) may also be signaled as part of the VPS extension.

Additionally or alternatively, the profile and level information, and/or the HRD parameters, may be signaled in a base layer SPS that is referred to by a reference layer or dependent view, and the reference layer or dependent view need not refer to any other SPSs. In this manner, the techniques of this disclosure include coding (e.g., encoding or decoding) a sequence parameter set (SPS) for a video bitstream, coding video data of a base layer of the video bitstream using the SPS, and coding video data of an enhancement layer of the video bitstream using at least a portion of the SPS, without using any other SPS for the enhancement layer. The SPS may include any or all of profile information, level information, and/or HRD parameters. Likewise, the techniques may include coding a VPS in addition to the SPS, where the VPS may include profile information, level information, and/or HRD parameters.

In addition, or in the alternative, when new coding tools are introduced for an enhancement layer (e.g., an enhancement view), flags enabling or disabling these tools may be present in the VPS, either for a whole operation point or for a whole view/layer. An operation point generally corresponds to a non-zero subset of decodable/displayable views of a full set of views of a bitstream. For example, if a bitstream includes eight views, an operation point may correspond to three of the eight views that can be properly decoded and displayed without the other five views.

In addition, or in the alternative, syntax elements may be signaled in an SPS for a base layer or base view. Then, rather than coding an additional SPS for an enhancement layer or additional view, a video coder may be configured to code the enhancement layer or additional view using the SPS for the base layer or base view. That is, the video coder may be configured to code video data of a base layer or base view using an SPS, then code video data of an enhancement layer or additional view using the same SPS (or, in other words, code video data of an enhancement layer or additional view using the SPS used to code the base layer or base view, without using any other SPSs for the enhancement layer or the additional view). Thus, the video coder may avoid coding redundant data in a plurality of distinct SPSs for the various layers or views, and instead code one SPS for a base layer or base view and code one or more enhancement layers or one or more additional views using the SPS for the base layer or base view. The SPS may be provided as part of the base layer or separately from the base layer. Furthermore, the SPS may include any or all of the data described above with respect to the VPS.

FIG. 1 is a block diagram illustrating an example video encoding and decoding system 10 that may utilize techniques for reusing information of a parameter set, e.g., across various layers of a bitstream. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for reusing information of a parameter set. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for reusing information of a parameter set may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with the techniques of this disclosure, video encoder 20 and video decoder 30 may be configured to reuse information of a parameter set, e.g., between different layers of a video bitstream. As noted above, parameter sets may include, for example, video parameter sets (VPSs) and sequence parameter sets (SPSs). In accordance with the techniques of this disclosure, video encoder 20 and video decoder 30 may be configured to reuse at least a portion of a VPS and/or an SPS when coding various layers of a video bitstream.

Table 1 below provides an example set of syntax for a video parameter set.

TABLE 1

| video_parameter_set_rbsp( ) { | Descriptor |
|---|---|
| vps_max_temporal_layers_minus1 | u(3) |
| vps_max_layers_minus1 | u(5) |
| profile_space | u(3) |
| profile_idc | u(5) |
| for( j = 0; j < 32; j++ ) | |
|   profile_compatability_flag[ i ] | u(1) |
| constraint_flags | u(16) |
| level_idc | u(8) |
| level_lower_temporal_layers_present_flag | u(1) |
| if( level_lower_temporal_layers_present_flag ) | |
|   for( i = 0; i < vps_max_temporal_layers_minus1; i++ ) | |
|     level_idc_temporal_subset[ i ] | u(8) |
| video_parameter_set_id | u(5) |
| vps_temporal_id_nesting_flag | u(1) |
| ... | |
| bit_equal_to_one | u(1) |
| profile_level_info( 0, vps_max_temporal_layers_minus1 ) | |
| hrd_parameters( ) | |
| ... | |
| vps_extension2_flag | u(1) |
| if( vps_extension2_flag ) | |
|   while( more_rbsp_data( ) ) | |
|     vps_extension_data_flag | u(1) |
| } | |
| rbsp_trailing_bits( ) | |
| } | |

In the example of Table 1, the video parameter set includes additional syntax elements relative to the video parameter set of HEVC WD7. In particular, the video parameter set in the example of Table 1 includes profile_level_info( ) and hrd_parameters( ). Other syntax elements, and semantics thereof, may remain the same or substantially the same as defined in HEVC WD7. Syntax elements for profile_level_info( ) may correspond to the syntax of Table 2 below, while syntax for hrd_parameters( ) may correspond to the syntax of Table 3 below. Although HEVC WD7 currently defines syntax and semantics for hrd_parameters( ), it should be noted that in the example of Table 1, hrd_parameters( ) is provided in a VPS, rather than in video usability information (VUI) parameters.

Table 2 provides an example set of syntax elements for profile_level_info( ) of Table 1. Semantics for these syntax elements may remain substantially as defined in HEVC WD7, except that these semantics may be defined for these syntax elements when provided in profile_level_info( ) of a VPS, instead of an SPS.

TABLE 2

| profile_level_info( index, NumTempLevelMinus1 ) { | |
|---|---|
| profile_space | u(3) |
| profile_idc | u(5) |
| for( j = 0; j < 32; j++ ) | |
|    profile_compatability_flag[ I ] | u(1) |
| constraint_flags | u(16) |
| level_idc | u(8) |
| level_lower_temporal_layers_present_flag | u(1) |
| if( level_lower_temporal_layers_present_flag ) | |
|   for ( i = 0; i < NumTempLevelMinus1; i++ ) | |
|     level_idc[ i ] | u(8) |
| profileLevelInfoIdx = index | |
| } | |

Table 3 provides an example set of syntax elements for hrd_parameters( ) of Table 1. Semantics for these syntax elements may remain as defined in HEVC WD7, except that these semantics may be defined for these syntax elements when provided in hrd_parameters( ) of a VPS, instead of VUI parameters.

TABLE 3

| hrd_parameters( ) { | Descriptor |
|---|---|
| cpb_cnt_minus1 | ue(v) |
| bit_rate_scale | u(4) |
| cpb_size_scale | u(4) |
| for( SchedSelIdx = 0; SchedSelIdx <= cpb_cnt_minus1; SchedSelIdx++ ) { | |
|   bit_rate_value_minus1[ SchedSelIdx ] | ue(v) |
|   cpb_size_value_minus1[ SchedSelIdx ] | ue(v) |
|   cbr_flag[ SchedSelIdx ] | u(1) |
| } | |
| initial_cpb_removal_delay_length_minus1 | u(5) |
| cpb_removal_delay_length_minus1 | u(5) |
| dpb_output_delay_length_minus1 | u(5) |
| time_offset_length | u(5) |
| } | |

Table 4 below provides an example set of syntax elements for a revised sequence parameter set in accordance with certain examples of the techniques of this disclosure. Semantics that are modified for certain syntax elements are described below.

TABLE 4

| seq_parameter_set_rbsp( ) { | Descriptor |
|---|---|
| profile_space | u(3) |
| profile_idc | u(5) |
| constraint_flags | u(16) |
| level_idc | u(8) |
| for( i = 0; i < 32; i++ ) | |
|   profile_compatability_flag[ i ] | u(1) |

TABLE 4-continued

| seq_parameter_set_rbsp( ) { | Descriptor |
|---|---|
| seq_parameter_set_id | ue(v) |
| video_parameter_set_id | ue(v) |
| chroma_format_idc | ue(v) |
| if( chroma_format_idc == 3 ) | |
|   separate_colour_plane_flag | u(1) |
| sps_max_temporal_layers_minus1 | u(3) |
| pic_width_in_luma_samples | ue(v) |
| pic_height_in_luma_samples | ue(v) |
| pic_cropping_flag | u(1) |
| if( pic_cropping_flag ) { | |
|   pic_crop_left_offset | ue(v) |
|   pic_crop_right_offset | ue(v) |
|   pic_crop_top_offset | ue(v) |
|   pic_crop_bottom_offset | ue(v) |
| } | |
| bit_depth_luma_minus8 | ue(v) |
| bit_depth_chroma_minus8 | ue(v) |
| [Ed. (BB): chroma bit depth present in HM software but not used further ] | |
| pcm_enabled_flag | u(1) |
| if( pcm_enabled_flag ) { | |
|   pcm_sample_bit_depth_luma_minus1 | u(4) |
|   pcm_sample_bit_depth_chroma_minus1 | u(4) |
| } | |
| log2_max_pic_order_cnt_lsb_minus4 | ue(v) |
| for( i = 0; i <= sps_max_temporal_layers_minus1; i++ ) { | |
|   sps_max_dec_pic_buffering[ i ] | ue(v) |
|   sps_num_reorder_pics[ i ] | ue(v) |
|   sps_max_latency_increase[ i ] | ue(v) |
| } | |
| restricted_ref_pic_lists_flag | u(1) |
| if( restricted_ref_pic_lists_flag ) | |
|   lists_modification_present_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| if( pcm_enabled_flag ) { | |
|   log2_min_pcm_coding_block_size_minus3 | ue(v) |
|   log2_diff_max_min_pcm_coding_block_size | ue(v) |
| } | |
| max_transform_hierarchy_depth_inter | ue(v) |
| max_transform_hierarchy_depth_intra | ue(v) |
| scaling_list_enable_flag | u(1) |
| if( scaling_list_enable_flag ) { | |
|   sps_scaling_list_data_present_flag | u(1) |
|   if( sps_scaling_list_data_present_flag ) | |
|     scaling_list_param( ) | |
| } | |
| chroma_pred_from_luma_enabled_flag | u(1) |
| transform_skip_enabled_flag | u(1) |
| seq_loop_filter_across_slices_enabled_flag | u(1) |
| asymmetric_motion_partitions_enabled_flag | u(1) |
| nsrqt_enabled_flag | u(1) |
| sample_adaptive_offset_enabled_flag | u(1) |
| adaptive_loop_filter_enabled_flag | u(1) |
| if( pcm_enabled_flag ) | |
|   pcm_loop_filter_disable_flag | u(1) |
| sps_temporal_id_nesting_flag | u(1) |
| [Ed. (BB): x y padding syntax missing here, present in HM software ] | |
| num_short_term_ref_pic_sets | ue(v) |
| for( i = 0; i < num_short_term_ref_pic_sets; i++) | |
|   short_term_ref_pic_set( i ) | |
| long_term_ref_pics_present_flag | u(1) |
| sps_temporal_mvp_enable_flag | u(1) |
| vui_parameters_present_flag | u(1) |
| if( vui_parameters_present_flag ) | |
|   vui_parameters( ) | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

In some examples, for a view or layer referring to the sequence parameter set (SPS) of Table 4, but that has reserved_zero_6 bits (layer_id) not equal to 0, profile_space, constraint_flags, level_idc, and profile_compatability_flag [i], in the sequence parameter set, may be ignored by video encoder 20 and video decoder 30 when coding data of a operation point containing this view or layer. Similarly, in some examples, the hrd parameters included in the SPS are not applicable to the operation point containing a view or layer with reserved_zero_6 bits not equal to 0, even it refers to the SPS. This information, including profile, level, and/or HRD parameters, may instead be present in the video parameter set, as part of the extension, as described above with respect to Tables 1-3. In other words, coding video data of an enhancement layer may include determining an operation point in which the enhancement layer is included, and, based on the determined operation point, coding the video data of the enhancement layer without using one or more characteristics signaled in the SPS (where these characteristics may correspond to, e.g., profile_space, constraint_flags, level_idc, profile_compatability_flag[i], and/or hrd parameters). Instead, the video coder may code the enhancement layer using corresponding data from the VPS.

One example is that of an HEVC stereo bitstream that contains just one SPS with sps_id equal to 0 and one VPS with vps_id equal to 0. The SPS may contain a profile conforming to the HEVC main profile. All VCL NAL units may refer to the same SPS with sps_id equal to 0 and the SPS refers to the VPS with vps_id equal to 0. In the VPS extension part of HEVC base view, profile related information for the stereoscopic video may be specified together with HRD parameters for the stereoscopic operation point. Thus, the whole bitstream in this example may contain just one VPS, one SPS, and one PPS. In some examples, view dependency for an enhancement view may also be signaled as part of a VPS extension.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
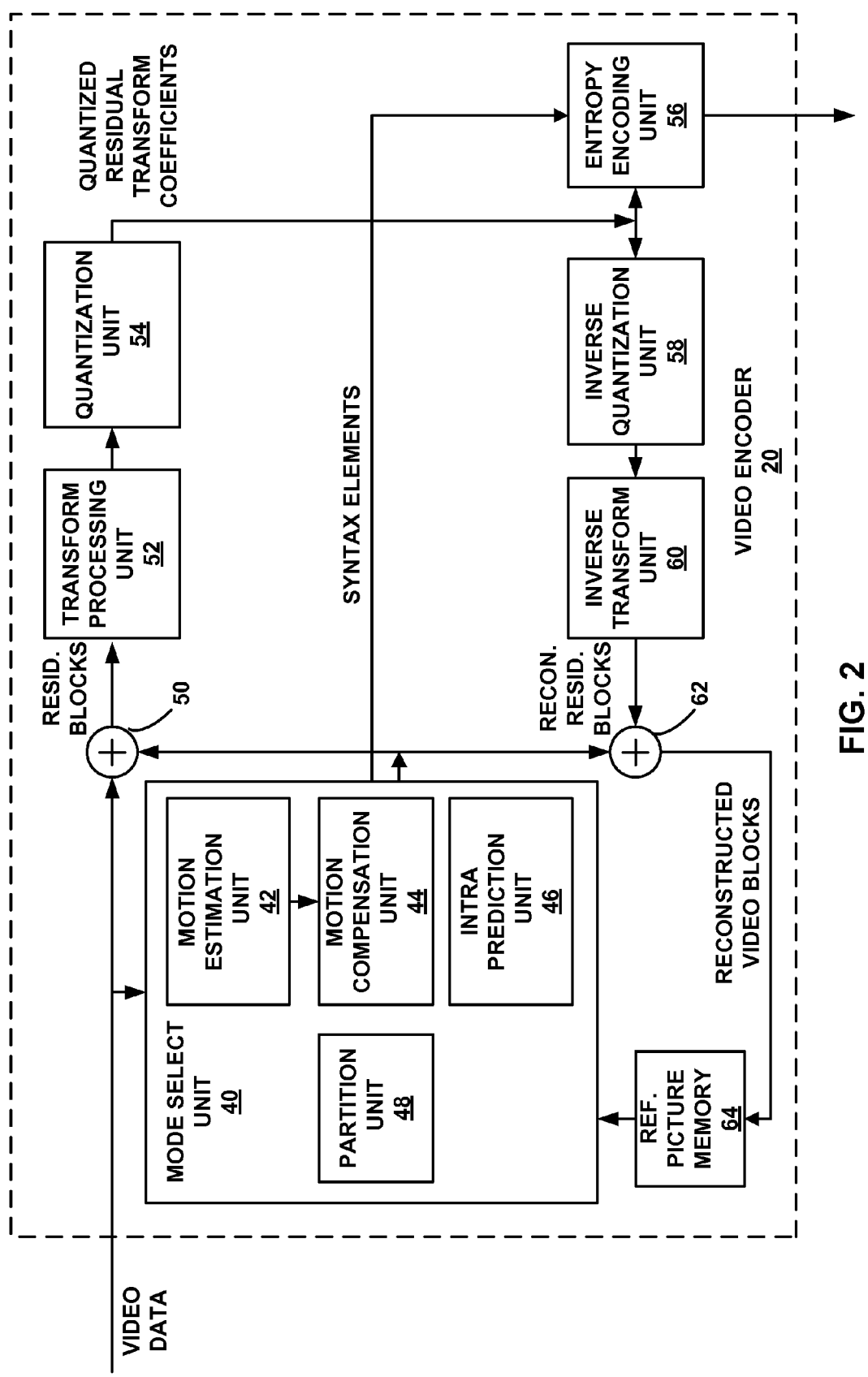
FIG. 2 is a block diagram illustrating an example of a video encoder that may implement techniques for reusing information of a parameter set.

FIG. 2 is a block diagram illustrating an example of video encoder 20 that may implement techniques for reusing information of a parameter set. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As discussed above, video encoder 20 may be configured, in accordance with the techniques of this disclosure, to encode a parameter set (e.g., an SPS, a PPS, a VPS, or the like) to include certain data, and then encode video data according to the parameter set. For instance, video encoder 20 may encode an SPS for a base layer of video data (e.g., a base scalable layer or a base view for multiview video coding). The parameter set may include profile and/or level information, such as a profile indicator and a level indicator. In some examples, the profile and level information may include any or all of the syntax elements of Table 2.

As explained above, profile and level information generally specifies coding tools that are used to code a corresponding set of video data. Thus, video encoder 20 may determine to enable or disable certain coding tools, e.g., depending on whether or not the tools improve coding efficiency and/or to provide a bitstream that is compliant with relatively more or less sophisticated video decoders. Accordingly, video encoder 20 may set values for profile and/or level information that indicate the use of these various tools that have been enabled or disabled.

In accordance with various aspects of the techniques described in this disclosure, video encoder 20 may code values for the profile and/or level information in an SPS, e.g., an SPS of a base layer (which may correspond to a base view). For example, the actual coded data for the SPS may occur within a NAL unit of the base layer. Video encoder 20 may further encode video data of the base layer using the SPS. For example, video encoder 20 may encode video data of the base layer using those tools that are enabled in accordance with the profile and level information of the SPS (and without using tools that are disabled by the profile and level information).

In addition, video encoder 20 may encode video data of one or more enhancement layers (or dependent views) using the SPS, without using any other SPSs for the one or more enhancement layers. That is, video encoder 20 may encode the one or more enhancement layers using the same SPS that was used to encode the base layer, without referring to any other SPSs for the one or more enhancement layers. For example, video encoder 20 may encode the video data of the one or more enhancement layers (or dependent views) using tools that are enabled by profile and level information of the SPS, without using tools that are disabled (or not enabled) by the profile and level information.

Additionally or alternatively, video encoder 20 may encode HRD parameters into the SPS. As discussed above, HRD parameters may describe characteristics of a decoder for decoding a corresponding bitstream or sub-bitstream (e.g., a corresponding layer, view, or operation point). For instance, the HRD parameters may describe a number of pictures to be stored in a coded picture buffer, a bit rate for the bitstream, a removal delay for removing pictures from the coded picture buffer, a decoded picture buffer output delay, or other such parameters.

In accordance with various aspects of the techniques described in this disclosure, video encoder 20 may encode video data of a base layer including an SPS that specifies the HRD parameters based on the values of the HRD parameters. For example, assuming the HRD parameters specify a number of pictures to be stored in a coded picture buffer, video encoder 20 may encode video data of the base layer such that at most that number of pictures is stored in the coded picture buffer. As another example, assuming the HRD parameters describe a bitrate for the bitstream, video encoder 20 may allocate bits among slices of video data and make encoding decisions, such as selecting quantization parameters, such that the corresponding bitstream does not exceed the bitrate indicated by the HRD parameters. Video encoder 20 may similarly encode one or more enhancement layers based on the HRD parameters indicated by the SPS of the base layer, without using any other SPSs for the one or more enhancement layers.

In some examples, in addition or in the alternative to the above aspects of the techniques, video encoder 20 may code view dependency information, for multiview video coding, in a VPS extension. For instance, video encoder 20 may encode data indicative of which views depend on which other views. In general, a view (that is, a reference view) depends on another view (that is, a base view) when the reference view can use the base view for reference for inter-view predictive coding. Thus, video encoder 20 may encode data indicating which reference views use a particular base view for inter-view reference prediction.

In some examples, in addition or in the alternative to the above aspects of the techniques, video encoder 20 may code values that enable or disable new coding tools in a base layer (or base view) SPS that is referred to by video data of the base layer and, potentially, one or more enhancement layers (or dependent views). Additionally or alternatively, video encoder 20 may code these values in a VPS. For instance, video encoder 20 may code these values in a VPS such that the values are applicable to a particular operation point or to a particular view or layer. In other words, the new coding tools may be selectively enabled or disabled for individual layers, individual views, or each layer/view of an operation point, in various examples.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this manner, video encoder 20 of FIG. 2 represents an example of a video encoder configured to encode parameter set information (e.g., an SPS) for a video bitstream, encode video data of a base layer of the video bitstream using the parameter set information, and encode video data of an enhancement layer of the video bitstream using at least a portion of the parameter set information. Furthermore, assuming the parameter set information is an SPS, video encoder 20 may encode the enhancement layer without using any other SPS for the enhancement layer. It should be understood that video encoder 20 may still use other types of parameter sets, such as a PPS and/or a VPS, when encoding the enhancement layer. The parameter set information may include, for example, profile information, level information, and/or HRD parameters, individually or in any combination. The parameter set information may also include other types of parameters as well (e.g., in addition to or in the alternative to any or all of the profile information, level information, and/or HRD parameters).

Video encoder 20 of FIG. 2 also represents an example of a video encoder configured to code parameter set information for a video bitstream, code video data of a base layer of the video bitstream using the parameter set information, and code video data of an enhancement layer of the video bitstream using at least a portion of the parameter set information.

Video encoder 20 of FIG. 2 also represents an example of a video coder configured to code a sequence parameter set (SPS) for a video bitstream, code a video parameter set (VPS) for the bitstream, code video data of a base layer of the video bitstream using the SPS, and code video data of an enhancement layer of the video bitstream using at least a portion of the SPS, without using any other SPS for the enhancement layer, and using at least a portion of the VPS.

Figure 3:
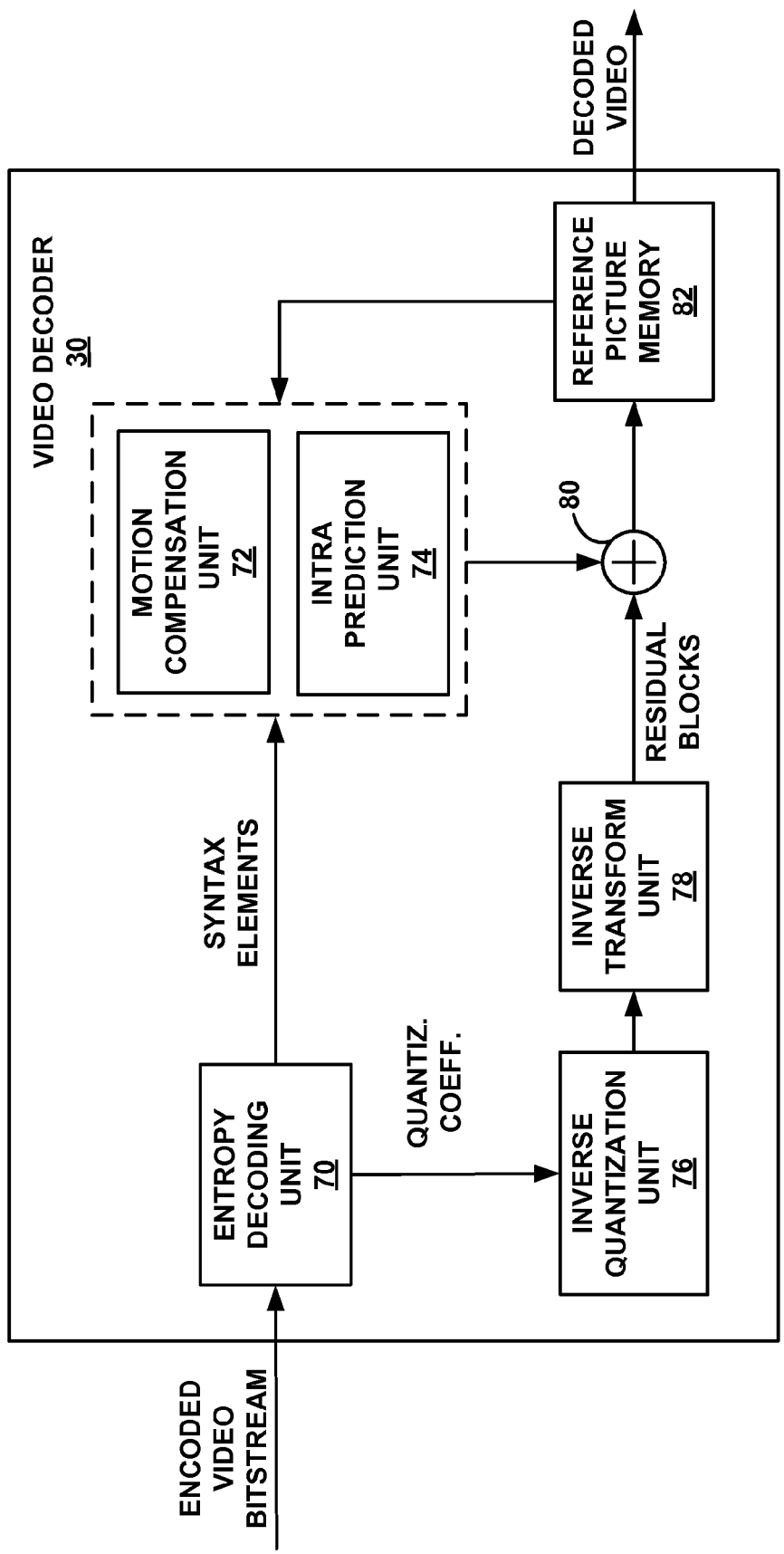
FIG. 3 is a block diagram illustrating an example of a video decoder that may implement techniques for reusing information of a parameter set.

FIG. 3 is a block diagram illustrating an example of video decoder 30 that may implement techniques for reusing information of a parameter set. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

In accordance with various aspects of the techniques described in this disclosure, video decoder 30 may decode one or more layers (e.g., one or more views or one or more scalable layers in the sense of scalable video coding (SVC)) of video data relative to the same parameter set, e.g., a sequence parameter set (SPS). For example, video decoder 30 may decode an SPS for a base layer. Video decoder 30 may decode video data of the base layer using the SPS. In addition, video decoder 30 may also decode video data of one or more enhancement layers (e.g., dependent views) using the SPS. Video decoder 30 need not use any other SPSs when decoding the video data of the enhancement layers, assuming video decoder 30 uses the SPS of the base layer.

As discussed above, in accordance with various aspects of the techniques described in this disclosure, video decoder 30 may decode one or more of profile information, level information, and/or HRD parameters from an SPS (e.g., an SPS of a base layer). When profile and/or level information is provided in the SPS, video decoder 30 may enable/disable various coding tools (or configure the coding tools) based on the profile/level information. In this manner, video decoder 30 may determine whether syntax data will be provided (and should be expected) in the bitstream for a particular coding tool, if additional signaling data is needed, and thus, determine how to properly parse and decode the bitstream based on the SPS. In addition, video decoder 30 may activate or deactivate various coding tools based on the signaled data of the SPS, in this example.

Additionally or alternatively, the SPS may signal HRD parameters. As discussed above, HRD parameters may provide information indicative of, for example, a removal delay for removing pictures from the coded picture buffer, a decoded picture buffer output delay, or other such parameters. Accordingly, video decoder 30 may determine when to remove pictures from a coded picture buffer (not shown) in order to decode the coded pictures. Similarly, video decoder 30 may determine a delay to apply to outputting pictures from the decoded picture buffer (which may correspond to reference picture memory 82 in FIG. 3).

In this manner, video decoder 30 may decode video data of a base layer (which may correspond to a base view) and video data of a reference layer (which may correspond to a dependent view) based on the same SPS, e.g., a base layer SPS. That is, video decoder 30 may decode an SPS, decode video data of a base layer using the SPS, and decode video data of a dependent view using the SPS (that is, the same SPS that was used to decode the base layer video data). Furthermore, video decoder 30 may decode the dependent view video data without referring to any SPS other than the SPS that was used to decode the base layer.

During the decoding process, video decoder 30 receives an encoded video bitstream that represents video blocks of an encoded video slice and associated syntax elements from video encoder 20. The encoded video bitstream may be temporarily stored in a coded picture buffer (not shown in FIG. 3). The coded picture buffer may be positioned before or after entropy decoding unit 70. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Reference picture memory 82 may also be referred to as a decoded picture buffer.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 represents an example of a video decoder configured to decode a sequence parameter set (SPS) for a video bitstream, decode video data of a base layer of the video bitstream using the SPS, and decode video data of an enhancement layer of the video bitstream using at least a portion of the SPS, without using any other SPS for the enhancement layer. It should be understood that video decoder 30 may still use other types of parameter sets, such as a PPS and/or a VPS, when decoding the enhancement layer. The parameter set information may include, for example, profile information, level information, and/or HRD parameters, individually or in any combination. The parameter set information may also include other types of parameters as well (e.g., in addition to or in the alternative to any or all of the profile information, level information, and/or HRD parameters).

Video decoder 30 of FIG. 3 also represents an example of a video decoder configured to code parameter set information for a video bitstream, code video data of a base layer of the video bitstream using the parameter set information, and code video data of an enhancement layer of the video bitstream using at least a portion of the parameter set information.

Video decoder 30 of FIG. 3 also represents an example of a video coder configured to code a sequence parameter set (SPS) for a video bitstream, code a video parameter set (VPS) for the bitstream, code video data of a base layer of the video bitstream using the SPS, and code video data of an enhancement layer of the video bitstream using at least a portion of the SPS, without using any other SPS for the enhancement layer, and using at least a portion of the VPS.

Figure 4:
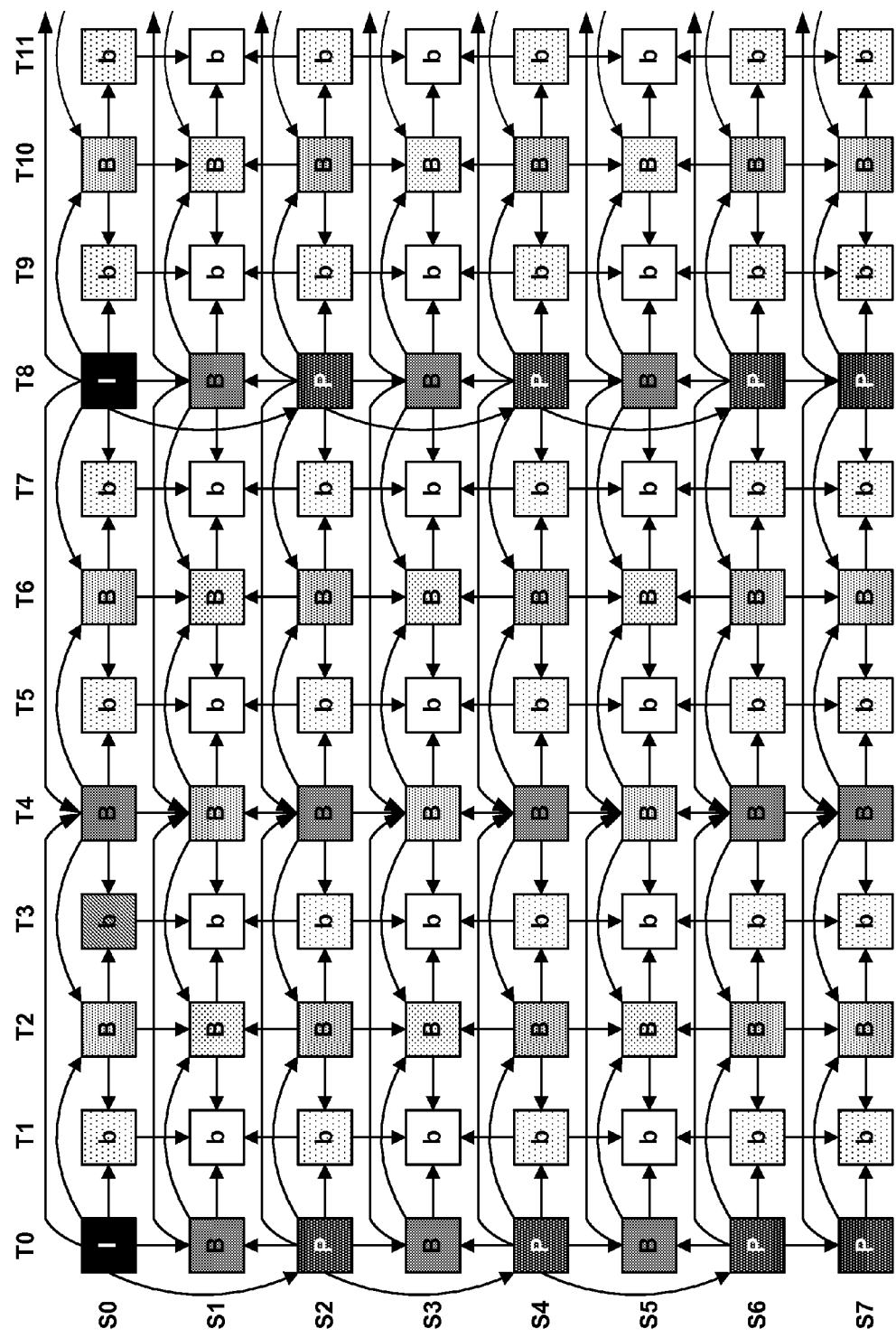
FIG. 4 is a conceptual diagram illustrating an example multiview video coding (MVC) prediction pattern.

FIG. 4 is a conceptual diagram illustrating an example MVC prediction pattern. Multi-view video coding (MVC) is an extension of ITU-T H.264/AVC. A similar technique may be applied to HEVC. In the example of FIG. 4, eight views (having view IDs "S0" through "S7") are illustrated, and twelve temporal locations ("T0" through "T11") are illustrated for each view. That is, each row in FIG. 4 corresponds to a view, while each column indicates a temporal location.

Although MVC has a so-called base view which is decodable by H.264/AVC decoders and stereo view pair could be supported also by MVC, one advantage of MVC is that it could support an example that uses more than two views as a 3D video input and decodes this 3D video represented by the multiple views. A renderer of a client having an MVC decoder may expect 3D video content with multiple views.

A typical MVC decoding order arrangement is referred to as time-first coding. An access unit may include coded pictures of all views for one output time instance. For example, each of the pictures of time T0 may be included in a common access unit, each of the pictures of time T1 may be included in a second, common access unit, and so on. The decoding order is not necessarily identical to the output or display order.

Frames in FIG. 4 are indicated at the intersection of each row and each column in FIG. 4 using a shaded block including a letter, designating whether the corresponding frame is intra-coded (that is, an I-frame), or inter-coded in one direction (that is, as a P-frame) or in multiple directions (that is, as a B-frame). Frames designated as b-frames (that is, with a lowercase "b") may also be inter-coded in multiple directions, and generally refer to frames that are lower in a coding hierarchy in the view or temporal dimensions than B-frames (that is, with a capital "B"). In general, predictions are indicated by arrows, where the pointed-to frame uses the pointed-from object for prediction reference. For example, the P-frame of view S2 at temporal location T0 is predicted from the I-frame of view S0 at temporal location T0.

As with single view video encoding, frames of a multi-view video coding video sequence may be predictively encoded with respect to frames at different temporal locations. For example, the b-frame of view S0 at temporal location T1 has an arrow pointed to it from the I-frame of view S0 at temporal location T0, indicating that the b-frame is inter-predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references may be signaled in the Sequence Parameter Set (SPS) MVC extension and can be modified by the reference picture list construction process, which enables flexible ordering of the inter-prediction or inter-view prediction references.

In the MVC extension of H.264/AVC, inter-view prediction is allowed among pictures in the same access unit (that is, pictures having the same time instance). When coding a picture in one of the non-base views, a picture may be added into a reference picture list, if it is in a different view but with a same time instance. An inter-view prediction reference picture can be put in any position of a reference picture list, just like any inter prediction reference picture.

In the MVC extension of H.264/AVC, as an example, inter-view prediction is supported by disparity motion compensation, which uses the syntax of the H.264/AVC motion compensation, but allows a picture in a different view to be used as a reference picture. Coding of two views can be supported by MVC, which is generally referred to as stereoscopic views. One of the advantages of MVC is that an MVC encoder could take more than two views as a 3D video input and an MVC decoder can decode such a multiview representation. So, a rendering device with an MVC decoder may expect 3D video contents with more than two views.

Table 5 below represents the ITU-T H.264/AVC MVC extension for a sequence parameter set, generally referred to herein as the "SPS MVC extension."

TABLE 5

| seq_parameter_set_mvc_extension( ) { | C | Descriptor |
|---|---|---|
| num_views_minus1 | 0 | ue(v) |
| for( i = 0; i <= num_views_minus1; i++ ) | | |
|   view_id[ i ] | 0 | ue(v) |
| for( i = 1; i <= num_views_minus1; i++ ) { | | |
|   num_anchor_refs_l0[ i ] | 0 | ue(v) |
|   for( j = 0; j < num_anchor_refs_l0[ i ]; j++ ) | | |
|     anchor_ref_l0[ i ][ j ] | 0 | ue(v) |

TABLE 5-continued

| seq_parameter_set_mvc_extension( ) { | C | Descriptor |
|---|---|---|
|     num_anchor_refs_l1[ i ] | 0 | ue(v) |
|     for( j = 0; j < num_anchor_refs_l1[ i ]; j++ ) | | |
|       anchor_ref_l1[ i ][ j ] | 0 | ue(v) |
|   } | | |
|   for( i = 1; i <= num_views_minus1; i++ ) { | | |
|     num_non_anchor_refs_l0[ i ] | 0 | ue(v) |
|     for( j = 0; j < num_non_anchor_refs_l0[ i ]; j++ ) | | |
|       non_anchor_ref_l0[ i ][ j ] | 0 | ue(v) |
|     num_non_anchor_refs_l1[ i ] | 0 | ue(v) |
|     for( j = 0; j < num_non_anchor_refs_l1[ i ]; j++ ) | | |
|       non_anchor_ref_l1[ i ][ j ] | 0 | ue(v) |
|   } | | |
|   num_level_values_signalled_minus1 | 0 | ue(v) |
|   for( i = 0; i <= num_level_values_signalled_minus1; i++ ) { | | |
|     level_idc[ i ] | 0 | u(8) |
|     num_applicable_ops_minus1[ i ] | 0 | ue(v) |
|     for( j = 0; j <= num_applicable_ops_minus1[ i ]; j++ ) { | | |
|       applicable_op_temporal_id[ i ][ j ] | 0 | u(3) |
|       applicable_op_num_target_views_minus1[ i ][ j ] | 0 | ue(v) |
|       for( k = 0; k <= applicable_op_num_target_views_minus1[ i ][ j ]; k++ ) | | |
|         applicable_op_target_view_id[ i ][ j ][ k ] | 0 | ue(v) |
|       applicable_op_num_views_minus1[ i ][ j ] | 0 | ue(v) |
|     } | | |
|   } | | |
| } | | |

In the example of the SPS MVC extension of Table 5, for each view, the number of views that can be used to form reference picture list 0 and reference picture list 1 are signaled. A prediction relationship for an anchor picture, as signaled in the SPS MVC extension, can be different from the prediction relationship for a non-anchor picture (signaled in the SPS MVC extension) of the same view.

A subset of views S0 to S7 that can be decoded and displayed without other views not in the subset may be referred to as an operation point. In accordance with the techniques of this disclosure, certain parameters of operation points may be signaled in a parameter set and at least partially reused across different layers, e.g., different views. For instance, profile and level information for the operation point may be signaled in a VPS. As another example, HRD parameters may be signaled in the VPS. Any of profile, level, and HRD parameters may be signaled in a parameter set and used to code two or more layers (e.g., views), in any combination.

Figure 5:
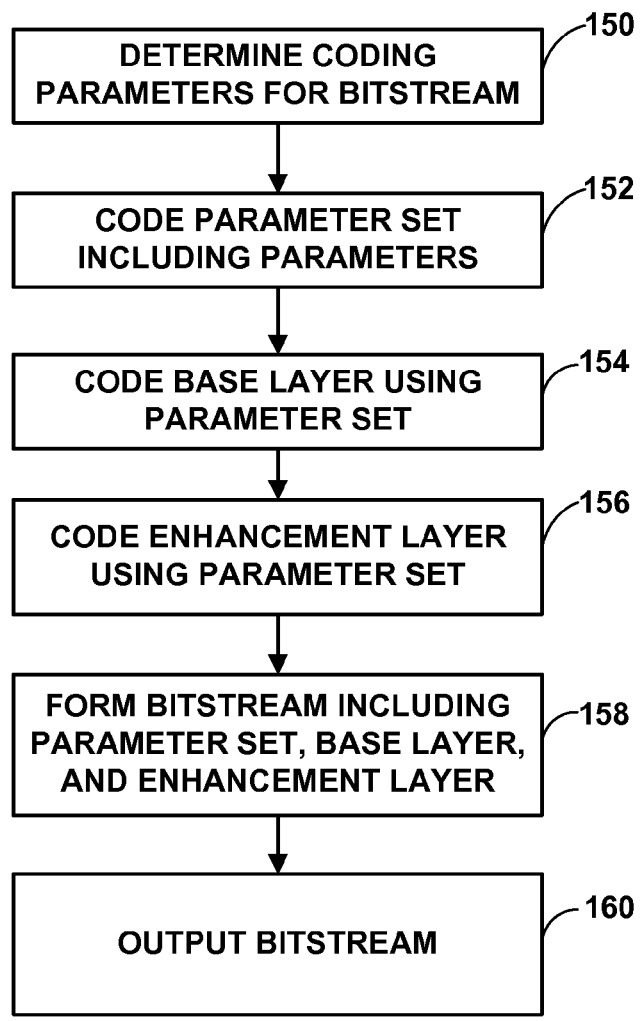
FIG. 5 is a flowchart illustrating an example method for coding a bitstream while reusing parameters of a parameter set when coding multiple layers, e.g., multiple views.

FIG. 5 is a flowchart illustrating an example method for coding a bitstream while reusing parameters of a parameter set when coding multiple layers, e.g., multiple views. Although described with respect to video encoder 20 (FIGS. 1 and 2), it should be understood that other devices may be configured to perform a method similar to that of FIG. 5.

In this example, video encoder 20 initially determines coding parameters for a video bitstream to be produced as a result of the coding process (150). For example, video encoder 20 may determine profile information, level information, and/or HRD parameters. Video encoder 20 may then code a parameter set to include the parameters (152), such as a VPS or an SPS. Video encoder 20 may then code data of a base layer (e.g., a base view in multi-view video coding or stereoscopic video coding, or a base layer of scalable video coding) using data of the parameter set (154). Assuming that the parameter set is an SPS, video encoder 20 may encode video data of the base layer using the SPS. Video encoder 20 may encapsulate the SPS as a NAL unit that is provided in the base layer, or provide the SPS separately from the base layer (e.g., in a parameter set track).

Video encoder 20 may then encode an enhancement layer (e.g., a dependent view or other enhancement layer) using at least a portion of the parameter set (156), such as the profile information, level information, and/or HRD parameters. Assuming that the parameter set is the SPS referred to above, video encoder 20 may encode one or more enhancement layers (e.g., one or more dependent views) using the SPS. In particular, video encoder 20 need not refer to any other SPSs when encoding the one or more enhancement layers, except for the SPS used to encode the base layer. Of course, video encoder 20 may still refer to one or more other types of parameter sets, e.g., one or more PPSs or a VPS, in addition to the SPS.

Video encoder 20, or another device (such as a multiplexer) may then form a bitstream including the parameter set, the encoded data for the base layer, and the encoded data for the enhancement layer (158). Video encoder 20, or the other device, may then output the bitstream (160), e.g., onto a storage medium, across a network, or using another output mechanism.

In this manner, FIG. 5 represents an example of a method including coding parameter set information for a video bitstream, coding video data of a base layer of the video bitstream using the parameter set information, and coding video data of an enhancement layer of the video bitstream using at least a portion of the parameter set information. For instance, the method may include encoding a sequence parameter set (SPS) for a video bitstream, encoding video data of a base layer of the video bitstream using the SPS, and encoding video data of an enhancement layer of the video bitstream using at least a portion of the SPS, without using any other SPS for the enhancement layer.

Figure 6:
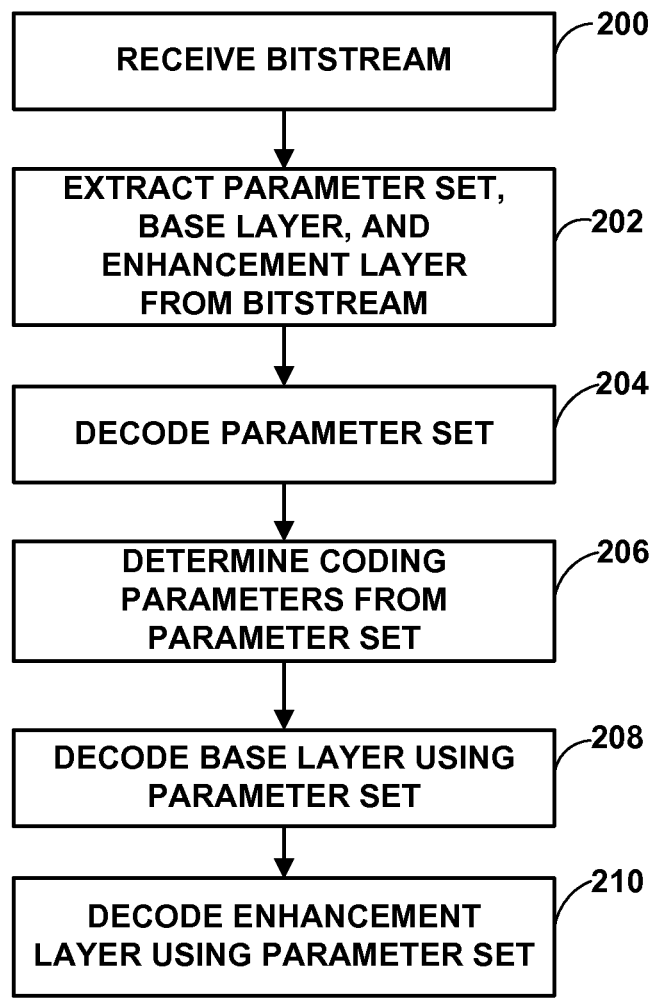
FIG. 6 is a flowchart illustrating another example method for coding a bitstream while reusing parameters of a parameter set when coding multiple layers, e.g., multiple views.

FIG. 6 is a flowchart illustrating another example method for coding a bitstream while reusing parameters of a parameter set when coding multiple layers, e.g., multiple views. Although described with respect to video decoder 30 (FIGS. 1 and 3), it should be understood that other devices may be configured to perform a method similar to that of FIG. 6.

Video decoder 30, or another device such as a demultiplexing unit, may receive data of bitstream (200). It should be understood that receiving the bitstream as shown in step 200 of FIG. 6 does not necessarily represent receiving the full bitstream, but instead may represent receiving a portion of the bitstream, e.g., during streaming or other incremental retrieval of a bitstream. Likewise, the bitstream may be buffered, e.g., in a coded picture buffer, prior to retrieval from the coded picture buffer by video decoder 30.

In any case, video decoder 30, or another device such as a demultiplexing unit, may extract a parameter set (such as a VPS or SPS) from the bitstream, as well as data for a base layer and data for an enhancement layer from the bitstream (e.g., an access unit including various view components for various views or other components for other scalable video coding techniques) (202). For instance, the parameter set may correspond to an SPS including profile and level information. In this case, video decoder 30 may enable and configure certain coding tools, and disable other coding tools, based on the profile and level information of the SPS. As another example, the parameter set may correspond to an SPS including HRD parameters, which may define when video decoder 30 is to extract data of the base layer and the enhancement layer from a coded picture buffer and/or when to output data from a decoded picture buffer.

Video decoder 30 may then decode the parameter set (204) and determine coding parameters from the parameter set (206), such as, for example, profile information, level information, and/or HRD parameters. Video decoder 30 may then decode data of the base layer using the parameter set (208), e.g., decode a view component of a base view using the parameter set, and decode data of the enhancement layer using the parameters (210), e.g., decode a view component of an enhancement view (e.g., a non-base view that is dependent on, e.g., is predicted from, the base view) using the parameter set.

In this manner, FIG. 6 represents an example of a method including coding parameter set information for a video bitstream, coding video data of a base layer of the video bitstream using the parameter set information, and coding video data of an enhancement layer of the video bitstream using at least a portion of the parameter set information. For instance, the method may include decoding a sequence parameter set (SPS) for a video bitstream, decoding video data of a base layer of the video bitstream using the SPS, and decoding video data of an enhancement layer of the video bitstream using at least a portion of the SPS, without using any other SPS for the enhancement layer.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding a sequence parameter set (SPS) for a video bitstream, wherein the SPS defines a first set of profile information;

decoding a video parameter set (VPS) for the bitstream, wherein the VPS defines a second set of profile information that is different from the first set of profile information;

decoding video data of a base layer of the video bitstream using the SPS and using the first set of profile information; and decoding video data of an enhancement layer of the video bitstream using at least a portion of the SPS, without using any other SPS for the enhancement layer, and using the second set of profile information of the VPS.

2. The method of claim 1, further comprising:

activating the SPS for a picture of the base layer based on an identifier for the SPS of a slice of the picture of the base layer; and activating the SPS for a picture of the enhancement layer, corresponding to the picture of the base layer, based on the identifier for the SPS of the slice of the picture of the base layer.

3. The method of claim 1, wherein decoding the video data of the enhancement layer comprises decoding the video data of the enhancement layer in accordance with an extension to a video coding standard, and wherein the VPS indicates whether a coding tool of the extension to the video coding standard is enabled.

4. The method of claim 3, wherein the video coding standard comprises High Efficiency Video Coding (HEVC).

5. The method of claim 3, wherein the extension comprises one of a scalable video coding extension, a multiview video coding extension, and a three-dimensional video coding extension.

6. The method of claim 1, wherein decoding video data of the enhancement layer comprises determining an operation point in which the enhancement layer is included, and, based on the determined operation point, decoding the video data of the enhancement layer without using one or more characteristics signaled in the SPS and instead using one or more corresponding characteristics signaled in the VPS.

7. The method of claim 1, wherein the VPS includes hypothetical reference decoder (HRD) parameters, wherein the VPS applies to the base layer and the enhancement layer, and wherein decoding the SPS comprises decoding the SPS without decoding HRD parameters for the SPS.

8. The method of claim 1, wherein the VPS includes at least one of a profile indicator and a level indicator, wherein the profile indicator and the level indicator apply to operation points containing the enhancement layer.

9. A method of encoding video data, the method comprising:

encoding a sequence parameter set (SPS) for a video bitstream, wherein the SPS defines a first set of profile information;

encoding a video parameter set (VPS) for the bitstream, wherein the VPS defines a second set of profile information that is different from the first set of profile information;

encoding video data of a base layer of the video bitstream using the SPS and using the first set of profile information; and encoding video data of an enhancement layer of the video bitstream using at least a portion of the SPS, without using any other SPS for the enhancement layer, and using the second set of profile information of the VPS.

10. The method of claim 9, further comprising coding an identifier for the SPS in a slice of a picture of the base layer.

11. The method of claim 9, wherein encoding the video data of the enhancement layer comprises encoding the video data of the enhancement layer in accordance with an extension to a video coding standard, and wherein the VPS indicates whether a coding tool of the extension to the video coding standard is enabled.

12. The method of claim 11, wherein the video coding standard comprises High Efficiency Video Coding (HEVC).

13. The method of claim 11, wherein the extension comprises one of a scalable video coding extension, a multiview video coding extension, and a three-dimensional video coding extension.

14. The method of claim 9, wherein encoding video data of the enhancement layer comprises determining an operation point in which the enhancement layer is included, and, based on the determined operation point, encoding the video data of the enhancement layer without using one or more characteristics signaled in the SPS and instead using one or more corresponding characteristics signaled in the VPS.

15. The method of claim 9, wherein the VPS includes hypothetical reference decoder (HRD) parameters, wherein the VPS applies to the base layer and the enhancement layer, and wherein encoding the SPS comprises encoding the SPS without encoding HRD parameters for the SPS.

16. The method of claim 9, wherein the VPS includes at least one of a profile indicator and a level indicator, wherein the profile indicator and the level indicator apply to operation points containing the enhancement layer.

17. A device for coding video data, the device comprising:

a memory configured to store data of a video bitstream; and a video coder configured to:

code a sequence parameter set (SPS) for the video bitstream, wherein the SPS defines a first set of profile information, code a video parameter set (VPS) for the bitstream, wherein the VPS defines a second set of profile information that is different from the first set of profile information, code video data of a base layer of the video bitstream using the SPS and using the first set of profile information, and code video data of an enhancement layer of the video bitstream using at least a portion of the SPS, without using any other SPS for the enhancement layer, and using the second set of profile information of the VPS.

18. The device of claim 17, wherein the video coder is configured to activate the SPS for a picture of the base layer based on an identifier for the SPS of a slice of the picture of the base layer, and activate the SPS for a picture of the enhancement layer, corresponding to the picture of the base layer, based on the identifier for the SPS of the slice of the picture of the base layer.

19. The device of claim 17, wherein the video coder is configured to code the video data of the enhancement layer in accordance with an extension to a video coding standard, and wherein the VPS indicates whether a coding tool of the extension to the video coding standard is enabled.

20. The device of claim 19, wherein the video coding standard comprises High Efficiency Video Coding (HEVC).

21. The device of claim 19, wherein the extension comprises one of a scalable video coding extension, a multiview video coding extension, and a three-dimensional video coding extension.

22. The device of claim 17, wherein the video coder is configured to determine an operation point in which the enhancement layer is included, and, based on the determined operation point, code the video data of the enhancement layer without using one or more characteristics signaled in the SPS and instead using one or more corresponding characteristics signaled in the VPS.

23. The device of claim 17, wherein the VPS includes hypothetical reference decoder (HRD) parameters, wherein the VPS applies to the base layer and the enhancement layer, and wherein the video coder is configured to code the SPS without coding HRD parameters for the SPS.

24. The device of claim 17, wherein the VPS includes at least one of a profile indicator and a level indicator, wherein the profile indicator and the level indicator apply to operation points containing the enhancement layer.

25. The device of claim 17, wherein the video coder comprises a video decoder.

26. The device of claim 17, wherein the video coder comprises a video encoder.

27. The device of claim 17, wherein the device comprises at least one of:
an integrated circuit;
a microprocessor; and
a wireless communication device.

28. A device for coding video data, the device comprising:
means for coding a sequence parameter set (SPS) for a video bitstream, wherein the SPS defines a first set of profile information;
means for coding a video parameter set (VPS) for the bitstream, wherein the VPS defines a second set of profile information that is different from the first set of profile information;
means for coding video data of a base layer of the video bitstream using the SPS and using the first set of profile information; and
means for coding video data of an enhancement layer of the video bitstream using at least a portion of the SPS, without using any other SPS for the enhancement layer, and using the second set of profile information of the VPS.

29. The device of claim 28, further comprising:
means for activating the SPS for a picture of the base layer based on an identifier for the SPS of a slice of the picture of the base layer; and
means for activating the SPS for a picture of the enhancement layer, corresponding to the picture of the base layer, based on the identifier for the SPS of the slice of the picture of the base layer.

30. The device of claim 28, wherein the means for coding the video data of the enhancement layer comprises means for coding the video data of the enhancement layer in accordance with an extension to a video coding standard, and wherein the VPS indicates whether a coding tool of the extension to the video coding standard is enabled.

31. The device of claim 30, wherein the video coding standard comprises High Efficiency Video Coding (HEVC).

32. The device of claim 30, wherein the extension comprises one of a scalable video coding extension, a multiview video coding extension, and a three-dimensional video coding extension.

33. The device of claim 28, wherein the means for coding video data of the enhancement layer comprise means for determining an operation point in which the enhancement layer is included, and means for coding the video data of the enhancement layer without using one or more characteristics signaled in the SPS based on the determined operation point and instead using one or more corresponding characteristics signaled in the VPS.

34. The device of claim 28, wherein the VPS includes hypothetical reference decoder (HRD) parameters, wherein the VPS applies to the base layer and the enhancement layer, and wherein the means for coding the SPS comprises means for coding the SPS without coding HRD parameters for the SPS.

35. The device of claim 28, wherein the VPS includes at least one of a profile indicator and a level indicator, wherein the profile indicator and the level indicator apply to the base layer and to the enhancement layer, and wherein the means for coding the SPS comprises means for coding the SPS without coding a profile indicator and a level indicator for the SPS.

36. A non-transitory computer-readable storage medium having stored thereon instructions that, when executed, cause a processor to:
code a sequence parameter set (SPS) for a video bitstream, wherein the SPS defines a first set of profile information;
code a video parameter set (VPS) for the bitstream, wherein the VPS defines a second set of profile information that is different from the first set of profile information;
code video data of a base layer of the video bitstream using the SPS and using the first set of profile information; and
code video data of an enhancement layer of the video bitstream using at least a portion of the SPS, without using any other SPS for the enhancement layer, and using the second set of profile information of the VPS.

37. The non-transitory computer-readable storage medium of claim 36, further comprising instructions that cause the processor to:
activate the SPS for a picture of the base layer based on an identifier for the SPS of a slice of the picture of the base layer; and
activate the SPS for a picture of the enhancement layer, corresponding to the picture of the base layer, based on the identifier for the SPS of the slice of the picture of the base layer.

38. The non-transitory computer-readable storage medium of claim 36, wherein the instructions that cause the processor to code the video data of the enhancement layer comprise instructions that cause the processor to code the video data of the enhancement layer in accordance with an extension to a video coding standard, and wherein the VPS indicates whether a coding tool of the extension to the video coding standard is enabled.

39. The non-transitory computer-readable storage medium of claim 38, wherein the video coding standard comprises High Efficiency Video Coding (HEVC).

40. The non-transitory computer-readable storage medium of claim 38, wherein the extension comprises one of a scalable video coding extension, a multiview video coding extension, and a three-dimensional video coding extension.

41. The non-transitory computer-readable storage medium of claim 38, wherein the instructions that cause the processor to decode video data of the enhancement layer comprise instructions that cause the processor to determine an operation point in which the enhancement layer is included, and, based on the determined operation point, decode the video data of the enhancement layer without using one or more characteristics signaled in the SPS and instead using one or more corresponding characteristics signaled in the VPS.

42. The non-transitory computer-readable storage medium of claim 36, wherein the VPS includes hypothetical reference decoder (HRD) parameters, wherein the VPS applies to the base layer and the enhancement layer, and wherein the instructions that cause the processor to code the SPS comprise instructions that cause the processor to code the SPS without coding HRD parameters for the SPS.

43. The non-transitory computer-readable storage medium of claim 36, wherein the VPS includes at least one of a profile indicator and a level indicator, wherein the profile indicator and the level indicator apply to the base layer and to the enhancement layer, and wherein the instructions that cause the processor to code the SPS comprise instructions that cause the processor to code the SPS without coding a profile indicator and a level indicator for the SPS.

* * * * *